US012687266B2

(12) United States Patent
Jiang

(10) Patent No.: US 12,687,266 B2
(45) **Date of Patent: *Jul. 21, 2026**

(54) ELECTRONIC CANDLE IN DUAL-CONTROL MODE

(71) Applicant: Yanyu Jiang, Zhejiang (CN)

(72) Inventor: Yanyu Jiang, Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/250,259

(22) Filed: Jun. 26, 2025

(65) Prior Publication Data

US 2026/0049700 A1 Feb. 19, 2026

Related U.S. Application Data

(63) Continuation-in-part of application No. 18/804,151, filed on Aug. 14, 2024, now Pat. No. 12,553,582.

(51) Int. Cl.

*F21S 6/00* (2006.01)
*F21S 10/04* (2006.01)
*F21V 23/04* (2006.01)

(52) U.S. Cl.

CPC .......... *F21S 6/001* (2013.01); *F21V 23/0485* (2013.01); *F21S 10/04* (2013.01); *F21V 23/04* (2013.01)

(58) Field of Classification Search

CPC .................................. F21S 6/001; F21S 10/04
See application file for complete search history.

(56) References Cited

U.S. PATENT DOCUMENTS 5,174,645 A * 12/1992 Chung .................. H04R 1/028 362/802
9,605,824 B1 * 3/2017 Li .......................... H05B 45/20
11,788,697 B1 * 10/2023 Chen ....................... F21S 10/04 362/157
11,879,615 B1 * 1/2024 Guo ...................... F21V 23/003
2008/0151563 A1 * 6/2008 Chen .................. F21V 23/0442 431/125
2014/0035483 A1 * 2/2014 Becker ...................... F21S 9/02 362/184
2016/0057829 A1 * 2/2016 Li .......................... F21K 9/232 315/313
2016/0161071 A1 * 6/2016 Jean ........................ F21S 6/001 362/183

(Continued)

FOREIGN PATENT DOCUMENTS

DE 202024104549 U1 * 8/2024 ............ F21S 10/043
KR 20100086529 A * 8/2010 .............. F21S 6/001

*Primary Examiner* — Alexander K Garlen
(74) *Attorney, Agent, or Firm* — Hawaii Patent Services; Nathaniel K. Fedde; Kenton N. Fedde

(57) ABSTRACT

The present invention proposes an electronic candle comprises a base, an outer shell and a simulated flame head with a first luminous body, wherein the outer shell is arranged on the base, the simulated flame head is arranged at the top of the outer shell. The base is provided with a battery capable of supplying power to the first luminous body and a PCB board for control; the simulated flame head is provided with a touch switch for people to touch, and the touch switch, the first luminous body, the battery and the PCB board are electrically connected together to form a control loop, such that the first luminous body is controlled to emit light or be turned off by touching the touch switch, wherein the touch switch comprises a touch electrode, which is structured as a helical spring.

18 Claims, 10 Drawing Sheets

(56) References Cited

U.S. PATENT DOCUMENTS

| | | | | |
|---|---|---|---|---|
| 2017/0307159 | A1* | 10/2017 | Li | H05B 47/19 |
| 2017/0311404 | A1* | 10/2017 | Li | H05B 47/16 |
| 2018/0038565 | A1* | 2/2018 | Li | H05B 47/12 |
| 2018/0094785 | A1* | 4/2018 | Li | H05B 45/20 |
| 2018/0283633 | A1* | 10/2018 | Roberts | H05B 47/155 |
| 2019/0032904 | A1* | 1/2019 | Wang | F21S 6/001 |
| 2021/0037650 | A1* | 2/2021 | Zhang | F21V 23/0485 |
| 2021/0048173 | A1* | 2/2021 | Li | F21S 6/001 |
| 2024/0044466 | A1* | 2/2024 | Li | F21S 9/02 |

* cited by examiner

ELECTRONIC CANDLE IN DUAL-CONTROL MODE

CROSS-REFERENCE TO RELATED APPLICATIONS

This application is a continuation-in-part of U.S. application Ser. No. 18/804,151 filed on Aug. 14, 2024, with title "ELECTRONIC CANDLE IN DUAL-CONTROL MODE", the entire contents of which are incorporated herein by reference.

TECHNICAL FIELD

The present invention relates to the technical field of electronic candles, in particular to an electronic candle.

BACKGROUND TECHNOLOGY

At present, in some specific circumstances, in order to reduce fire hazards, carbon dioxide emissions, ease of use as well as safety and other purposes, real candles are usually not used, but simulated electronic candles with similar shapes are used. LED lamps are used as light sources in the simulated electronic candles, which not only have lighting functions, but also can be designed with ornamental and entertainment functions, such as electronic flash candles, music candles and simulated kerosene lamps.

For example, the China utility model patent No. 2019202975042 (announcement No. CN209262910U) has disclosed an electronic candle, which comprises a tubular simulated candle body, an inner cover with a hollow simulated flame, a control switch, a resistor, an LED flashing light and a battery. The LED flashing light is installed in the hollow position of the simulated flame, and two connected battery tubes are fixed on the bottom plate of the tubular simulated candle body. Compression springs for connecting with battery electrodes are fixed at the bottom of the battery tubes, upon which the two compression springs are connected. It further comprises a PCB board. The control switch, the resistor and the LED flashing light are welded on the PCB board. The bottom of the PCB board is provided with contacts respectively positioned above the two battery tubes for connecting with the battery electrodes. The PCB board is fixedly connected with the bottom of the inner cover.

In addition, the China utility model patent with a patent number of 2019204024003 (with a publication number of CN209386167U) also discloses an electronic simulated flame head and electronic simulated candle, which comprises a simulated flame head body, wherein a first luminous body is encapsulated in the simulated flame head body, and the first luminous body comprises a carrier and a plurality of LED chips electrically connected with a control chip, and the plurality of LED chips are distributed on one side of the carrier, and when energized, the control chip controls the LED chip to partially or completely light up on the simulated flame head body to reveal a dynamic flame burning effect.

However, the above mentioned patents still have some areas for improvement. The power switches of the electronic candle are all arranged on the bottom surface of the base. In normal use, the electronic candles need to be picked up as a whole to operate, which is troublesome to use. Moreover, because some candle bodies are waxy, users may find them greasy to touch, which will negatively impact the user experience. Furthermore, even though some existing candle lamps are designed with touch-sensitive switches, such touch-sensitive components often make the flame of the candle lamp less vivid and flexible due to their characteristics, and there are certain reliability risks.

Therefore, there is a need to propose a new type of electronic candle, which is easy to operate and not easy to contaminate the grease on the wax skin.

SUMMARY

The present invention provides an electronic candle, which comprises a base, an outer shell and a simulated flame head with a first luminous body The outer shell is arranged on the base, and the simulated flame head is arranged at the top of the outer shell. Moreover, a battery capable of supplying power to the first luminous body and a PCB board for control are arranged on the base;

- the simulated flame head is provided with a touch switch for people to touch, and the touch switch, the first luminous body, the battery and the PCB board are electrically connected together to form a control loop, such that the first luminous body is controlled to emit light or be turned off by touching the touch switch;
- the touch switch comprises a touch electrode, which is structured as a helical spring, an interior of the simulated flame head forms an installation chamber to accommodate the touch electrode, the first luminous body is embedded in the installation chamber and positioned below the touch electrode, and both the touch electrode and the first luminous body are electrically connected to the PCB board via wires.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
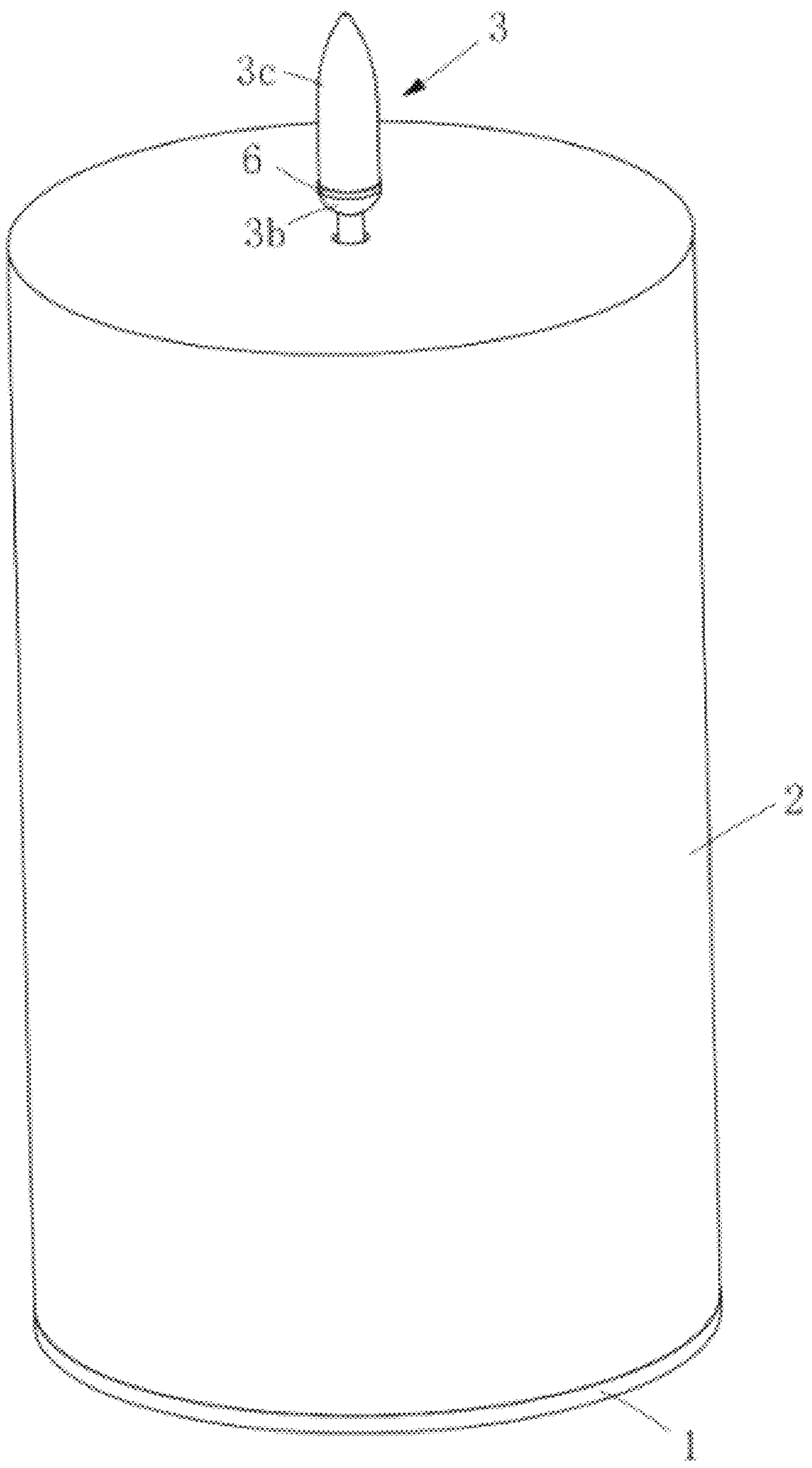
FIG. 1 is a schematic diagram of the three-dimensional structure of the present invention.

Reference signs: Base (1); Outer shell (2); Simulated flame head (3); First luminous body (3*a*); Connecting sleeve (3*b*); Step surface (3*b*1); Placing groove (3*b*2); Wire conduit (3*b*3); Simulated hood (3*c*); Battery (4); PCB board (5); Touch switch (6); Connecting part (6*a*); Wire (6*b*); Second luminous body (7); Switch (8);

Candle body (A); Base cover (11); Metal sleeve (21); Battery case (1*a*); Battery compartment (1*b*); Internal thread (21*a*); Installation chamber (3*c*); Touch electrode (6*b*1); Metal spring (5*a*); Mounting part (11*b*); External thread (11*b*1); Conductive plate (11*a*); Recess (11*c*); Pressing part (8*a*); Wire hole (2*c*); Control cavity (2*a*).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIGS. 1-6, it is the best embodiment of the utility model. The electronic candle with a dual-control mode in this embodiment mainly includes a base 1, an outer shell 2, a simulated flame head 3, a battery 4, a PCB board 5, a touch switch 6 and a switch 8. Wherein the outer shell 2 is wax.

Figure 2:
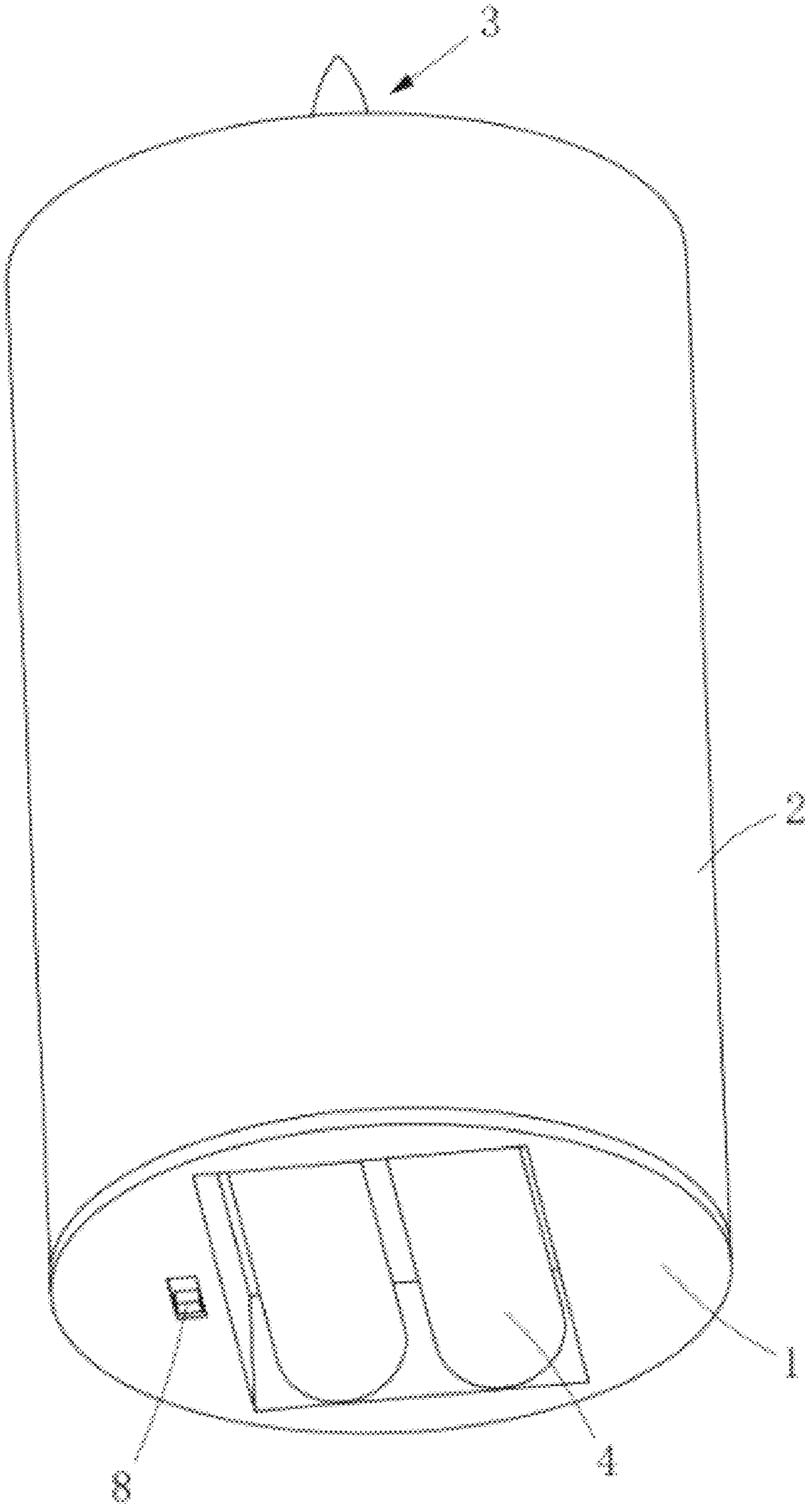
FIG. 2 is a schematic diagram of the three-dimensional structure of the bottom view angle of the present invention.
Figure 3:
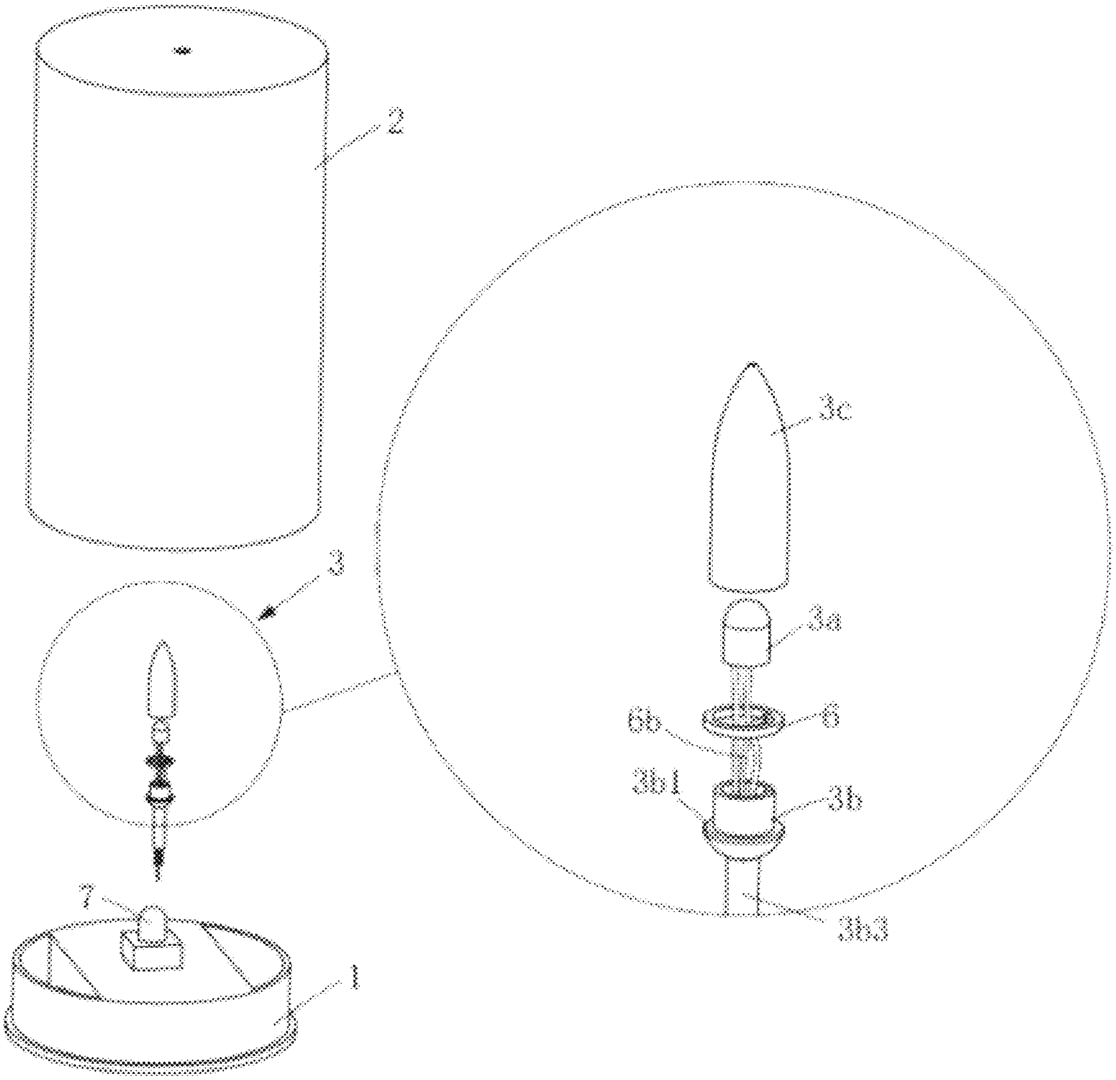
FIG. 3 is schematic diagram of the simulated flame head magnification of the present invention.

As shown in FIG. 2 to FIG. 3, the outer shell 2 is arranged on the base 1, and the simulated flame head 3 is exposed at the top of the outer shell 2. The simulated flame head 3 has a first luminous body 3*a* that can emit light. The base 1 is provided with a power supply 4 that can supply power to the first luminous body 3*a* and a PCB board 5 for control. The simulated flame head 3 is provided with a touch switch 6 that is exposed for people to touch. The touch switch 6, the first luminous body 3*a*, the power supply 4 and the PCB board 5 are electrically connected together to form a control loop, such that the first luminous body 3*a* can be controlled to emit light or be turned off by touching the touch switch 6.

It should also be noted that the operating principle of the touch switch 6 in this embodiment is the same as that of the capacitive touch switch in the prior art, and thus will not be described in detail in this embodiment.

In order to facilitate the installation of the first luminous body 3*a* and the touch switch 6 in this embodiment, as shown in FIGS. 2 to 5, in this embodiment, the simulated flame head 3 further includes a connecting sleeve 3*b*, a wire conduit 3*b*3 and a simulated hood 3*c*. The connecting sleeve 3*b* is connected to the outer shell 2 through the wire conduit 3*b*3, and the first luminous body 3*a* is arranged on the connecting sleeve 3*b*, and the touch switch 6 is also arranged on the connecting sleeve 3*b*.

Figure 4:
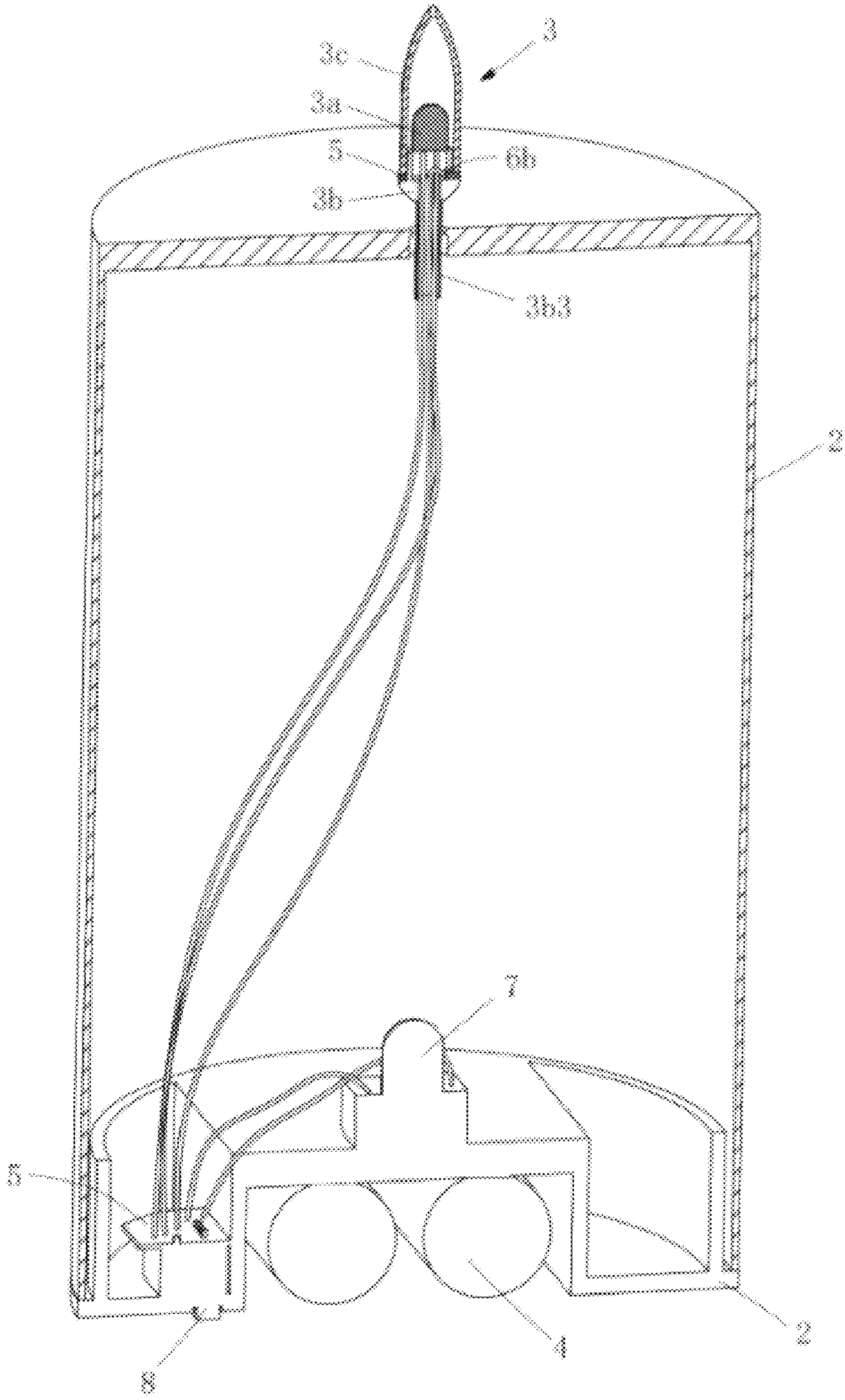
FIG. 4 is a schematic sectional view of the present invention.

In order to facilitate the installation of the touch switch 6 on the connecting sleeve 3*b*, refer to FIG. 4. In this embodiment, the touch switch 6 is designed in an annular structure, and a step surface 3*b*1 adapted to the bottom of the touch switch 6 is formed on the outer peripheral surface of the connecting sleeve 3*b*. And the touch switch 6 is sleeved on the outer peripheral side of the connecting sleeve 3*b* with the bottom attached to the step surface 3*b*1. The touch switch 6 can be firmly fixed to the connecting sleeve 3*b* through the mutual adaptation of the step surface 3*b*1 and the touch switch 6.

In other embodiments (not shown), the shape of the touch switch 6 is not limited to the ring structure, but can be adjusted according to the shape and layout requirements of the connecting sleeve 3*b*, as well as the installation space and functional requirements of the touch switch 6, for example, it can be replaced by a rectangular, circular, elliptical or other polygonal structure.

In other embodiments (not shown), the step surface 3*b*1 can be replaced by a groove, a flange, a card slot or other types of positioning structures to provide a stable connection with the bottom or other parts of the touch switch 6. In addition to the mutual adaptation between the step surface 3*b*1 and the bottom of the touch switch 6, other fixing methods such as mechanical buckle, spring clip or magnetic adsorption can be used.

Moreover, in order to connect the touch switch 6 and the PCB board 5 with the conductive wire 6*b* conveniently, and at the same time, the touch switch 6 can be positioned on the connecting sleeve 3*b* in the circumferential direction, in this embodiment, the inner side wall of the touch switch 6 extends inward to form a connecting part 6*a*. Correspondingly, the connecting sleeve 3*b* is further provided with a placing groove 3*b*2 which can accommodate the connecting portion 6*a*. The touch switch 6 is provided with a wire 6*b*, one end of which is connected to the connecting part 6*a*, and the other end of the wire 6*b* extends downward through the connecting sleeve 3*b* and is connected to the PCB board 5.

In this embodiment, the touch switch 6, the first luminous body 3*a*, the battery 4 and the PCB board 5 are electrically connected together to form a control loop. Therefore, The touch switch 6 serves as the control trigger. When touched, it generates a signal that is processed by the PCB board 5, enabling power from the battery 4 to turn the first luminous body 3*a* on or off.

By providing the placing groove 3*b*2, when the touch switch 6 is installed, the connecting portion 6*a* can be inserted into the placing groove 3*b*2, so that the connecting portion 6*a* can be accommodated. In addition, the circumferential positioning and limiting of the touch switch 6 can be realized through the engagement between the connecting part 6*a* and the placing groove 3*b*2, so that the touch switch 6 will not move around the connecting sleeve 3*b*.

In other embodiments (not shown), in addition to realizing circumferential positioning through the connecting part 6*a* and the placing groove 3*b*2, additional positioning structures, such as pin insertion or screw insertion, can be added to the touch switch 6, which can improve the stability and accuracy of the installation of the touch switch 6 on the connecting sleeve 3*b* and reduce the stress on the connecting part 6*a*.

In addition, in order to keep the first luminous body 3*a* from being exposed, and to simulate the real flame effect, referring to FIG. 1, in this embodiment, the simulated hood 3*c* is made in the shape of a flame, the simulated hood 3*c* is sleeved on the outer peripheral side of the connecting sleeve 3*b*, and the bottom is pressed on the top of the touch switch 6, and the outer peripheral wall of the touch switch 6 can be exposed between the simulated hood 3*c* and the connecting sleeve 3*b*, so that the exposure of the outer peripheral wall of the touch switch 6 can be more conveniently controlled by the user through finger touch.

In this embodiment, when the electronic candle is used, it is only necessary to touch the touch switch 6 with a finger to control the opening or closing of the first luminous body 3*a*, so as not to touch the wax on the surface of the outer shell 2.

In other embodiments (not shown), the shape of the simulated hood 3*c* is not limited to the flame shape, and the shape of the simulated hood 3*c* can also be replaced with other shapes similar to the flame or having similar visual effects, such as waves, irregular curved surfaces, multi-layered folds and other shapes, as long as they can effectively shield the first luminous body 3*a* and produce the required visual effects. Of course, the simulated hood 3*c* can be made of transparent or translucent materials, and the flame texture pattern or light and shadow effect can be embedded in the material to simulate the flame more realistically.

Figure 5:
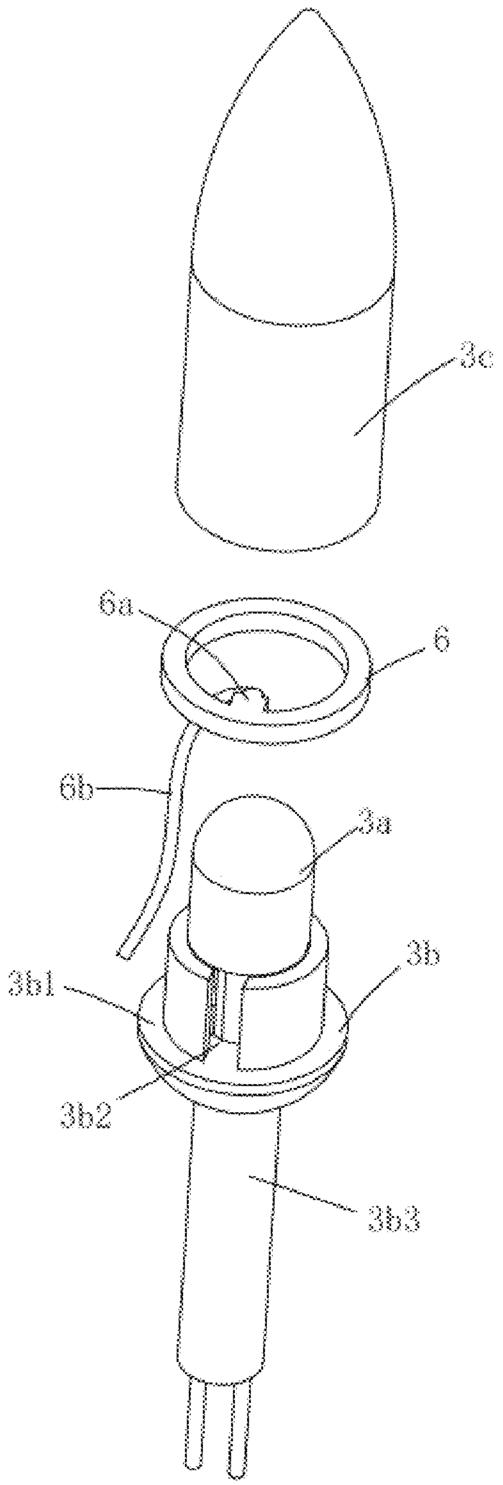
FIG. 5 is a schematic diagram of the exploded structure of the simulated flame head in the present invention.
Figure 6:
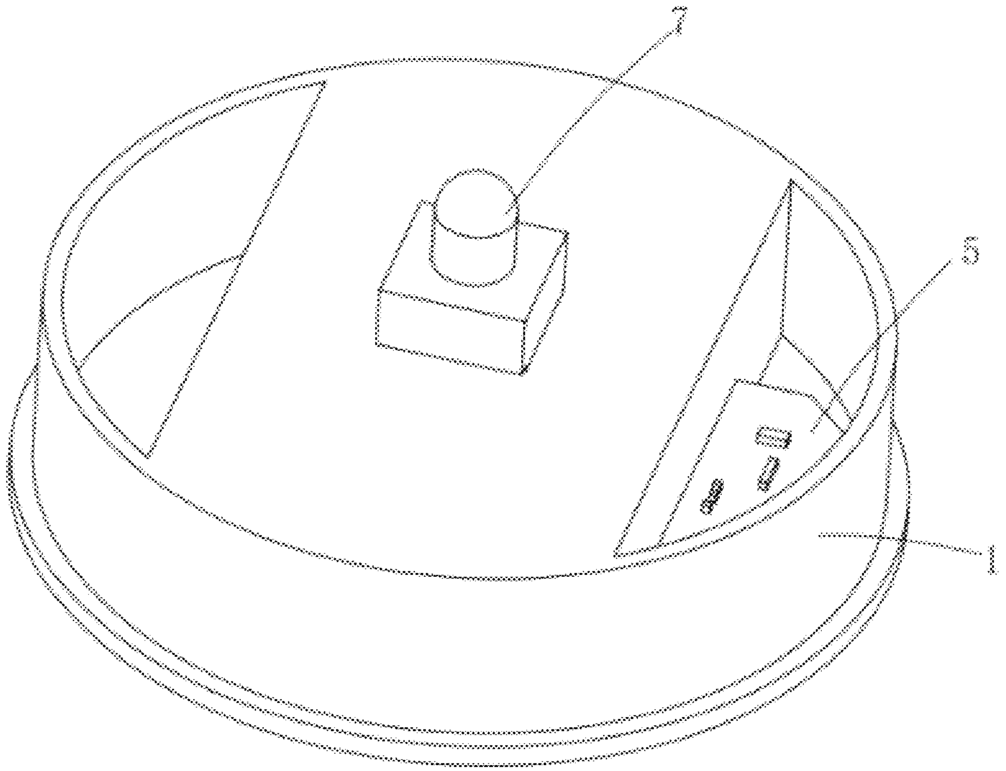
FIG. 6 is a schematic diagram of the three-dimensional structure of the base in the present invention.

In order to light up the bottom of the outer shell 2, so as to simulate a more realistic scene, referring to FIGS. 3 and 5, in this embodiment, the base 1 is further provided with a second luminous body 7, which is built in the outer shell 2 and electrically connected to the power supply 4, the PCB board 5 and the touch switch 6. Therefore, the touch switch 6, the first luminous body 3*a*, the second luminous body 7, the battery 4 and the PCB board 5 are electrically connected together to form a control loop, so that the first luminous body 3*a* and the second luminous body 7 can be simultaneously lit by controlling the touch switch 6.

The types of the first luminous body 3*a* and the second luminous body 7 can be replaced according to the required lighting effect and power consumption. For example, LED lamps or other light emitting elements can be used to replace the current luminous bodies. If it is necessary to simulate the flame of a specific color or other light source effects, you can choose a luminous body with corresponding color or color-changing function, such as a strip LED lamp with changeable colors, or an LED lamp with a flame shape.

In other embodiments, the first luminous body 3*a* or the second luminous body 7 can also be individually switched on and off and adjusted in color by touching the switch 6. For example, touching the touch switch 6 once is to switch the first light 3*a* or adjust the color, while touching the touch switch 6 twice continuously is to switch the second light 7 or adjust the color.

Moreover, the present invention is not limited to setting the first luminous body 3*a* and the second luminous body 7. In other embodiments, in order to increase the realistic effect of the electronic candle, luminous bodies such as LED bulbs, light strips, light strings and the like can be added at any other suitable position. Moreover, the newly added luminous body can also be controlled by the touch switch 6 and the switch 8, or the color can be adjusted.

As shown in FIG. 2 and FIG. 3, in order to make the whole electronic candle more safely controlled, in this embodiment, a switch 8 is additionally arranged at the bottom of the base 1, and the switch 8, the first luminous body 3*a*, the second luminous body 7, the power supply 4 and the PCB board 5 are electrically connected together to form a control loop. By controlling the switch 8, the whole circuit can be controlled on and off, and when the electronic candle is not used for a long time, the power supply can be cut off by controlling the switch 8, so as to avoid the inadvertent opening of the electronic candle caused by the accidental touch of the exposed touch switch 5, thus realizing the dual control mode.

In other embodiments, the switch 8 can be replaced by a rotary switch, a sliding switch, a touch switch and other switches with the same function, so as to provide different operation modes and increase the diversity of products.

In other embodiments (not shown), the switch 8 can also be installed on the side of the base 1 according to the actual situation, so that the switch 8 can be operated without picking up the electronic candle when operating, which makes the operation of the switch 8 more convenient.

In this embodiment, a plurality of batteries 4 are connected in series in a horizontal side-by-side manner, and as shown in FIG. 4, the installation mode of the batteries 4 is suitable for electronic candles with larger diameters. In other embodiments (not shown, a plurality of batteries 4 are also connected in series in a way that they can be connected up and down. This installation mode is applicable to a slender electronic candle, so that the electronic candle can be applied to different scenes.

In other embodiments (not shown), the inner surface of the outer shell 2 can be additionally provided with a colorless and transparent hard inner wall made of acrylic, glass or hard plastic, which can enhance the structural strength of the outer shell 2 and make the outer shell 2 not easy to be broken.

In other embodiments (not shown), the battery 4 can be a rechargeable lithium battery or a lithium-ion battery or a nickel-hydrogen battery. Both of these power supplies can supply power for a long time, which is suitable for devices that need continuous operation or high brightness. At the same time, they can be charged through USB or other charging interfaces, reducing the frequency and cost of battery replacement.

And in other embodiments (not shown), wireless communication functions can be added to the PCB board 5, such as adding Bluetooth, Wi-Fi or other wireless communication modules, so that the electronic candle device can communicate and control with other intelligent devices (such as mobile phones), and the control of the electronic candle is more convenient and quick.

Figure 7:
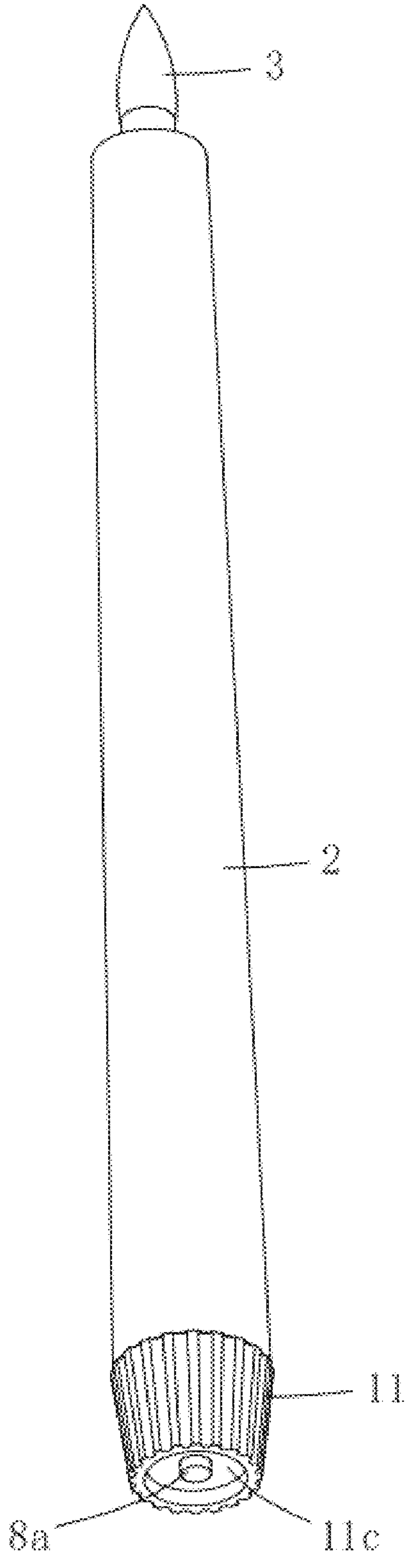
FIG. 7 is a schematic diagram of the structure of the touch electrode with a helical spring configuration in the present invention.
Figure 8:
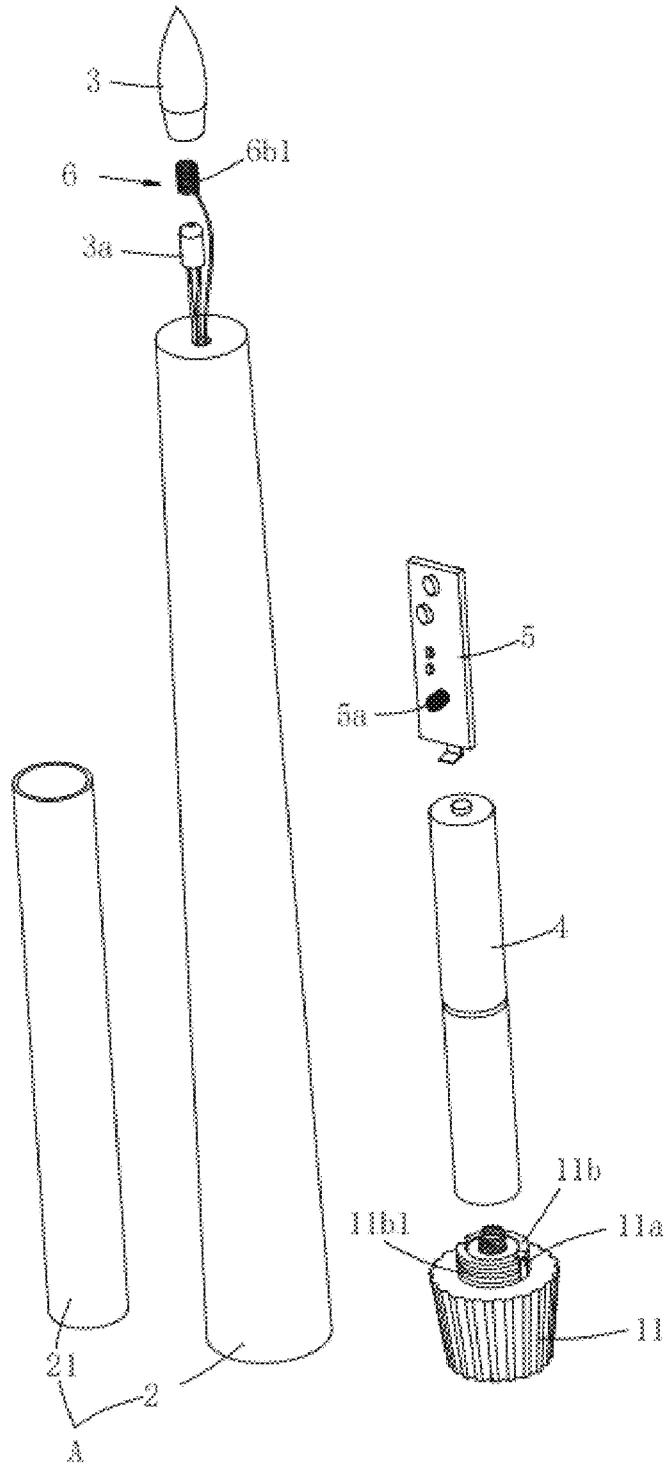
FIG. 8 is a schematic diagram of the exploded view of the structure shown in FIG. 7.
Figure 9:
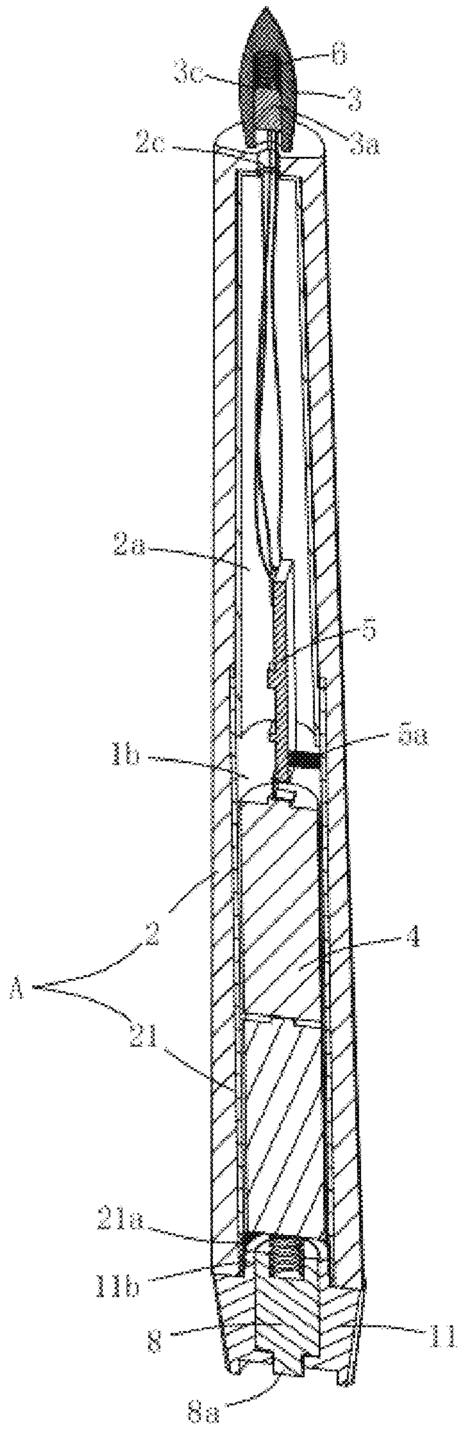
FIG. 9 is a schematic cross-sectional view of the structure shown in FIG. 7.

As a further innovative embodiment, this solution proposes an electronic candle as shown in FIG. 7~9, comprising a rod-shaped candle body A, a simulated flame head 3, a first luminous body 3*a*, a touch switch 6, a PCB board 5, a base cover 11, and other components. It is particularly noteworthy that the structure of the candle body A in this embodiment is not limited to the illustrated rod-shaped form and can be designed into other artistic shapes based on practical requirements.

Specifically, referring to the detailed illustrations in FIGS. 7 to 9, the candle body A in this embodiment adopts a dual-control composite structure design: the outer layer is an outer shell 2 made of wax material to simulate the texture and appearance of a traditional candle. Similarly, depending on the usage scenario, the outer layer can also be made of materials such as plastic. The inner layer is a precision-engineered metal sleeve 21, whose internal space is specifically designed for the battery compartment 1*b*. The inner sidewall at the lower end of the metal sleeve 21 features a precision internal thread 21*a* structure to ensure stable assembly of all components. The cross-section of the outer shell can be rectangular, circular, elliptical, or an irregular polygonal shape.

The primary structural difference between this embodiment and the previous one lies in: the simulated flame head 3 incorporates an installation chamber 3*c*, with the touch electrode 6*b*1 of the touch switch 6 vertically installed within this chamber 3*c*. The touch electrode 6*b*1 adopts a helical spring structure, which not only enhances touch sensitivity but also facilitates disassembly and positioning, preventing wobbling inside the simulated flame head 3. The helical spring automatically adjusts its compression based on external force, ensuring stable electrical contact under varying gestures or pressures, thereby improving touch responsiveness. Additionally, the spring structure itself provides cushioning, absorbing external vibrations and impacts to prevent poor contact or accidental triggers due to movement. The first luminous body 3*a* employs a multi-color LED module installed below the touch electrode 6*b*1. The battery 4 is selected in an appropriate size to match the battery compartment 1*b*. The PCB board 5 integrates a light source driving circuit and a mode control module. The driving circuit powers the first luminous body 3*a*, while the mode control module, electrically connected to the touch switch 6, enables switching between lighting modes of the first luminous body 3*a*. In some applications (not shown), the helical spring touch electrode 6*b*1 can function as a micro pressure sensor to interpret touch pressure for controlling the candle light's on/off state, or integrate a haptic feedback motor within the helical spring electrode to provide vibration responses upon pressing.

Furthermore, depending on actual lighting requirements, the first luminous body 3*a* here may consist of a single unit or multiple units. Multiple first luminous bodies 3*a* can emit light of different colors, and by operating the touch switch 6, these varied light sources can alternate or illuminate simultaneously. Similarly, as proposed in the above embodiment, a second luminous body 7 may be incorporated in the base cover 11 to enhance the effect.

The metal spring 5*a* on the PCB board 5 contacts the inner wall of the metal sleeve 21 to ensure stable circuit connectivity. The base cover 11 features a mounting part 11*b* with external threads 11*b*1 on its periphery, engaging with the internal threads 21*a* of the metal sleeve 21, and forms a conductive plate 11*a*. A recess 11*c* is carved into the lower surface of the base cover 11, housing the switch 8. Although the pressing part 8*a* of the switch protrudes from the bottom of the recess 11*c*, its height remains below the recess depth to prevent accidental activation of the control switch when the electronic candle is placed normally.

To balance the impact of the metal sleeve 21 on the light transmittance of the second luminous body 7 in the base cover 11, the following optimized designs can be adopted: set light-transmitting holes or hollow structures on the metal sleeve 21 at the position corresponding to the second luminous body 7, or arrange the metal sleeve 21 in segmented sections, offset from the second luminous body 7. This design effectively avoids the obstruction of light from the second luminous body 7 by the metal sleeve 21 while fully retaining the original structural support function and circuit connection stability of the metal sleeve 21.

The connection and assembly process of each component in the embodiment is as follows: referring to the illustration, first the PCB board 5 is placed inside the control cavity 2*a* of the candle body A, ensuring the metal spring 5*a* presses against the inner wall of the metal sleeve 21, completing the preliminary fixation of the PCB board 5 and preparing for circuit connection; then the battery 4 is installed into the battery compartment 1*b* formed by the metal sleeve 21, ensuring correct polarity connection and stable installation; next, the touch switch 6 and the first luminous body are connected to the PCB board 5 via a wire 6*b*, with the wire 6*b* routed out from inside the simulated flame head 3, passing downward through the wire hole 2*c* at the top of the candle body A and connecting to the corresponding interface on the PCB board 5; then the simulated flame head 3 is securely installed onto the top of the candle body A, ensuring a smooth appearance; finally, the mounting part 11*b* of the base cover 11 is aligned with the lower end of the metal sleeve 21, the base cover 11 is rotated so that the external thread 11*b*1 tightly engages with the internal thread 21*a* of the metal sleeve 21 until fully seated, at which point the conductive plate 11*a* makes good contact with the metal sleeve 21, and the switch 8 is electrically connected to the PCB board 5, completing the assembly of the entire electronic candle.

The working principle of the touch-sensitive switch in the embodiment is as follows: the touch electrode 6*b*1 of the touch switch 6 is a capacitive sensing component. When a human touches or approaches the outer surface of the simulated flame head 3, the human electric field interacts with the touch electrode 6*b*1, altering the electric field distribution around the touch electrode 6*b*1, thereby changing its capacitance value; this capacitance change is detected by the internal circuit of the touch switch 6 and converted into an electrical signal, transmitted via a wire 6*b* to the PCB board 5; upon receiving this signal, the mode control module on the PCB board 5 controls the light source driving circuit according to preset programs, enabling the switching on, off, or mode change of the first luminous body 3*a*.

Figure 10:
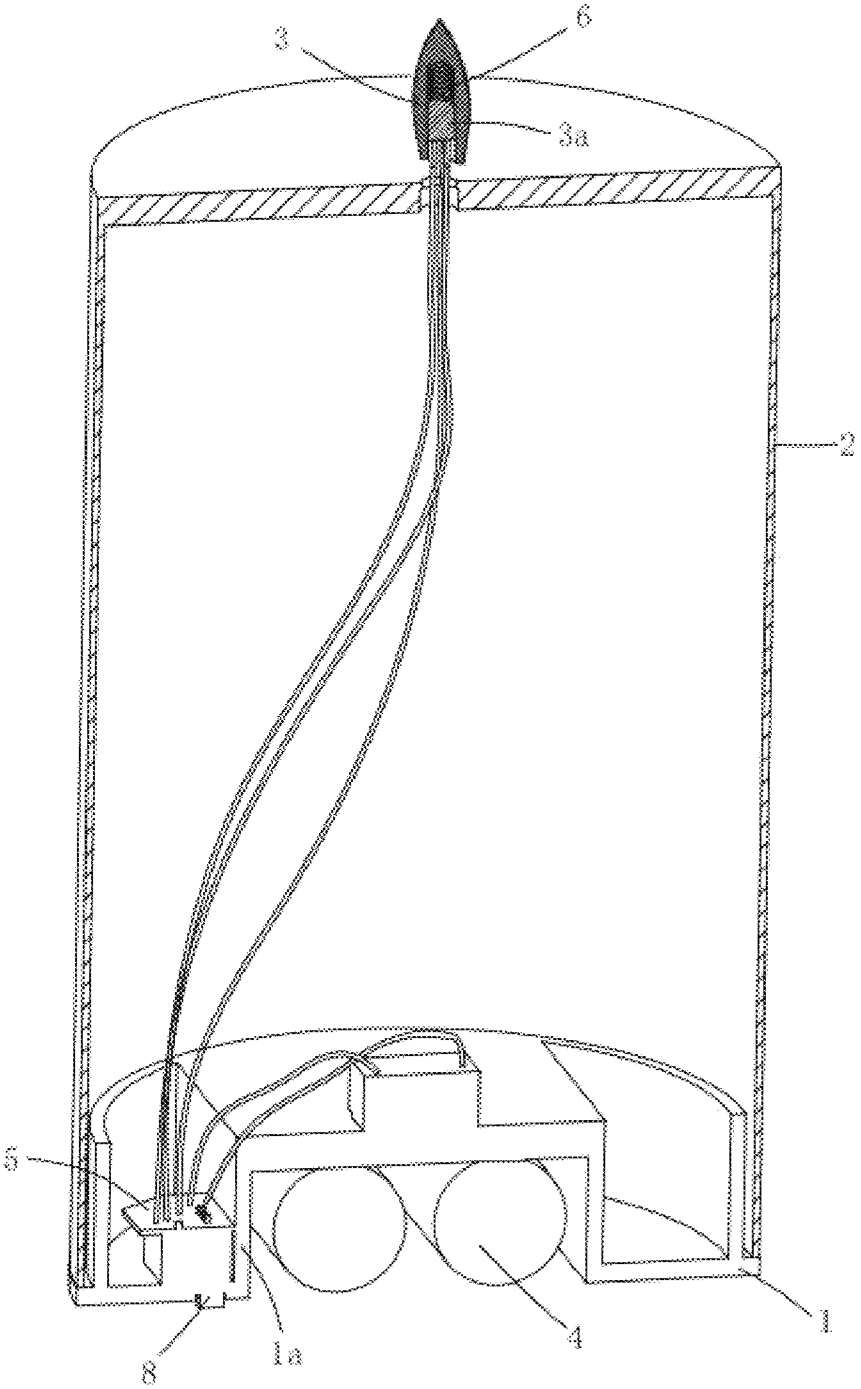
FIG. 10 illustrates an alternative embodiment of the structure shown in FIG. 7.

Regarding the shape of the candle body in the aforementioned embodiment, another embodiment is proposed as shown in FIG. 10. The optimized electronic candle with a dual-control mode in this embodiment mainly includes the candle body A, simulated flame head 3, first luminous body 3*a*, touch switch 6, and PCB board 5, among others.

Referring to FIG. 10, the candle body A includes an outer shell 2 and a base 1. The outer shell 2 has a cylindrical structure, and the base 1 is positioned at the bottom of the outer shell 2. The simulated flame head 3 is installed at the top of the outer shell 2, with a spiral spring-structured touch electrode 6*b*1 of the touch switch 6 and a multi-color LED module serving as the first luminous body 3*a* inside it. The battery 4 is placed in the battery case 1*a* of the base 1 to power the electronic candle. The PCB board 5 is mounted on the base 1, integrating a light source driving circuit and a mode control module to regulate the lighting mode and drive the illumination of the first luminous body 3*a*. The base 1 also features a switch 8, which connects electrically to the PCB board 5 to control the circuit's on/off state.

Similarly, referring to FIGS. 3 and 5, in this embodiment, a second luminous body 7 can be correspondingly installed on the base 1. The invention is not limited to the first luminous body 3*a* and the second luminous body 7; in other embodiments, additional luminous bodies such as LED bulbs, light strips, or light strings can be added to any suitable parts to enhance the realistic effect of the electronic candle. Moreover, these additional luminous bodies can also be controlled for on/off or color adjustment via the touch switch 6 and the switch 8.

The lighting modes include at least one of single-color steady light, multi-color switching, and intermittent flashing.

The connection and assembly process of the components in the embodiment are as follows: first, the PCB board 5 is installed on the base 1 and electrically connect the switch 8 to it. Then, the battery 4 is placed into the battery case 1*a*, ensuring correct polarity connections. The touch switch 6 and the first luminous body 3*a* are connected to the PCB board 5 via the wire 6*b*, which runs from inside the simulated flame head 3 downward through the candle body A to the corresponding interface on the base 1. Next, the simulated flame head 3 is securely installed onto the top of the candle body A, ensuring stable assembly and aesthetic coherence. Finally, the bottom of the candle body A is tightly connected to the base 1 to complete the assembly of the entire electronic candle. The working principle of the touch-sensitive switch in this embodiment is consistent with that of the previous embodiments.

In actual products, the casing of this candle lamp is not limited to the aforementioned rod-shaped or truncated cone shapes but can also adopt designs such as heart-shaped or other patterns.

From the above description, it can be seen that the aforementioned embodiment achieves the following technical effects: By placing the touch electrode 6*b*1 of the touch-sensitive switch 6 inside the simulated flame head 3, users only need to touch or approach the outer surface of the simulated flame head 3 to easily trigger the switch, thereby controlling the activation or deactivation of the light emitter. This design allows users to operate the candle effortlessly without significant movements, greatly enhancing convenience. At the same time, it avoids the drawback in prior art where exposed sensing elements compromise aesthetics, making the electronic candle appear more streamlined and complete, closer to the beauty of a real candle. In settings with high decorative requirements, it blends better into the environment, improving the overall visual effect. Additionally, since the touch electrode 6*b*1 is embedded inside the simulated flame head 3, it is well-protected and less susceptible to interference from external environmental factors (such as dust or moisture), enhancing the reliability and lifespan of the touch-sensitive switch 6.

In the description of the present disclosure, it should be appreciated that directional terms such as “front, rear, up, down, left, right”, “horizontal, vertical, perpendicular, horizontal” and “top, bottom” etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms “inside, outside” refer to the inside and outside relative to the contour of each component itself.

For the convenience of description, spatial relative terms such as “on . . . ”, “above . . . ”, “on the upper surface of . . . ”, “upper” etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as “above other devices or structures” or “on other devices or structures” will subsequently be positioned as “below other devices or structures” or “under other devices or structures”. Thus, the exemplary term “above” can include both “above” and “below” orientations. The device can also be positioned in other different ways (rotated 90 degrees or in other orientations), and the spatial relative descriptions used here should be interpreted accordingly.

In addition, it should be noted that the use of terms such as “first”, “second” etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. An electronic candle, comprising a base, an outer shell and a simulated flame head with a first luminous body, wherein the outer shell is arranged on the base, the simulated flame head is arranged at the top of the outer shell, and a battery capable of supplying power to the first luminous body and a PCB board for control are arranged on the base;

wherein the simulated flame head is provided with a touch switch for people to touch, and the touch switch, the first luminous body, the battery and the PCB board are electrically connected together to form a control loop, such that the first luminous body is controlled to emit light or be turned off by touching the touch switch; and wherein the touch switch includes a touch electrode, which is structured as a helical spring, an interior of the simulated flame head forms an installation chamber to accommodate the touch electrode, the first luminous body is embedded in the installation chamber and positioned below the touch electrode, and both the touch electrode and the first luminous body are electrically connected to the PCB board via wires; and wherein the base is further equipped with a second luminous body, which is embedded in the outer shell and electrically connected to the battery, the PCB board, and the touch switch to form a control loop.

2. The electronic candle according to claim 1, wherein a switch is additionally provided at a bottom of the base, and the switch, the first luminous body, the second luminous body, the battery, and the PCB board are electrically connected to form a control loop, enabling on/off of a main circuit by controlling the switch.

3. The electronic candle according to claim 1, wherein the first luminous body is a multicolor LED module located inside the simulated flame head, and the PCB board integrates a light source driving circuit and a mode control module;

the mode control module is electrically connected to the touch switch and configured to switch an illumination mode of the multicolor LED module based on continuous trigger signals from the touch switch; and the illumination mode comprises at least one of single-color steady light, multicolor switching, and intermittent flashing.

4. The electronic candle according to claim 1, wherein the outer shell is rod-shaped, with a control cavity for placing the PCB board and a battery compartment for placing the battery arranged sequentially from top to bottom inside the outer shell, the top of the outer shell is provided with a wire hole for threading wires vertically, and a bottom of the outer shell is detachably equipped with a base cover to enclose the battery compartment, which constitutes the base, wherein the base cover is further integrated with a switch, which is electrically connected to the PCB board to the connection or disconnection of the control loop.

5. The electronic candle according to claim 4, wherein a metal sleeve is arranged inside the outer shell, and an internal space of the metal sleeve forms the battery compartment; and the base cover further comprises a conductive plate for contacting the metal sleeve, and the PCB board is equipped with a metal spring that can press against an inner wall of the metal sleeve.

6. The electronic candle according to claim 5, wherein an inner sidewall of a lower end of the metal sleeve is provided with internal threads, while the base cover forms a connecting part that can extend into the metal sleeve, an outer periphery of the connecting part is also formed with external threads matching the internal threads, and the conductive plate is molded on the outer periphery of the connecting part.

7. The electronic candle according to claim 5, wherein a lower end surface of the base cover is formed with a recess, and the switch comprises a pressing part protruding from a bottom of the recess, with a height of the pressing part being less than a depth of the recess.

8. The electronic candle according to claim 1, wherein a cross-section of the outer shell is one of a rectangle, a circle, an ellipse, or an irregular polygon shape.

9. An electronic candle, comprising a base, an outer shell, and a simulated flame head, wherein, a first luminous body is arranged in the simulated flame head, and a second luminous body located in the outer shell is also arranged on the base; and wherein a touch switch is arranged on the simulated flame head, and the touch switch is touched by people and controls whether the first luminous body and the second luminous body emit light or not; and the base is provided with a switch, and the switch controls on-off of a circuit of the touch switch, the first luminous body and the second luminous body;

wherein the touch switch comprises a touch electrode arranged inside the simulated flame head, and the touch electrode has a helical spring structure.

10. The electronic candle according to claim 9, wherein the outer shell is arranged on the base, an interior of the simulated flame head forms an installation chamber adapted for the touch electrode, the first luminous body is built into the installation chamber and located below the touch electrode, and the base is provided with a battery for powering the first luminous body and the second luminous body, as well as a PCB board for control.

11. The electronic candle according to claim 10, wherein the touch switch, the first luminous body, the second luminous body, the battery and the PCB board are electrically connected together to form a control loop.

12. The electronic candle according to claim 9, wherein the switch, the first luminous body, the second luminous body, a battery and a PCB board are electrically connected together to form a control loop, and the on-off of the entire circuit is realized by controlling the switch.

13. An electronic candle, comprising a base, an outer shell, and a simulated flame head, wherein, the simulated flame head comprises a first luminous body and a touch switch, and the touch switch controls whether the first luminous body emits light;

wherein the outer shell is arranged on the base, the base is provided with a battery for powering the first luminous body and a PCB board for control, and the touch switch, the first luminous body, the battery, and the PCB board are electrically connected to form a control loop; and wherein the touch switch comprises a touch electrode, and the touch electrode has a helical spring structure; and wherein the base is further provided with a second luminous body, the second luminous body is built into the outer shell and electrically connected to the battery, the PCB board, and the touch switch to form a control loop.

14. The electronic candle according to claim 13, wherein a switch is additionally provided at a bottom of the base, and the switch, the first luminous body, the second luminous body, the battery, and the PCB board are electrically connected to form a control loop, enabling on/off of a main circuit by controlling the switch.

15. The electronic candle according to claim 13, wherein the outer shell is rod-shaped, with a control cavity for placing the PCB board and a battery compartment for placing the battery arranged sequentially from top to bottom inside the outer shell, the top of the outer shell is provided with a wire hole for threading wires vertically, and a bottom of the outer shell is detachably equipped with a base cover to enclose the battery compartment, which constitutes the base, wherein the base cover is further integrated with a switch, which is electrically connected to the PCB board to the connection or disconnection of the control loop.

16. The electronic candle according to claim 15, wherein a metal sleeve is arranged inside the outer shell, and an internal space of the metal sleeve forms the battery compartment; and the base cover further comprises a conductive plate for contacting the metal sleeve, and the PCB board is equipped with a metal spring that can press against an inner wall of the metal sleeve.

17. The electronic candle according to claim 16, wherein an inner sidewall of a lower end of the metal sleeve is provided with internal threads, while the base cover forms a connecting part that can extend into the metal sleeve, an outer periphery of the connecting part is also formed with external threads matching the internal threads, and the conductive plate is molded on the outer periphery of the connecting part.

18. The electronic candle according to claim 16, wherein a lower end surface of the base cover is formed with a recess, and the switch comprises a pressing part protruding from a bottom of the recess, with a height of the pressing part being less than a depth of the recess.

* * * * *